United States Patent
Dougherty et al.

(10) Patent No.: US 10,209,344 B2
(45) Date of Patent: Feb. 19, 2019

(54) METHODS AND SYSTEMS FOR MITIGATING MULTIPATH PROPAGATION

(71) Applicant: SRC, Inc., North Syracuse, NY (US)

(72) Inventors: John C. Dougherty, Liverpool, NY (US); Gregory A. Mesagna, Syracuse, NY (US)

(73) Assignee: SRC, Inc., North Syracuse, NY (US)

( * ) Notice: Subject to any disclaimer, the term of this patent is extended or adjusted under 35 U.S.C. 154(b) by 438 days.

(21) Appl. No.: 15/070,500

(22) Filed: Mar. 15, 2016

(65) Prior Publication Data

US 2017/0031003 A1   Feb. 2, 2017

Related U.S. Application Data

(60) Provisional application No. 62/131,900, filed on Mar. 12, 2015.

(51) Int. Cl.
| | | |
|---|---|---|
| *G01S 7/02* | (2006.01) | |
| *G01S 7/40* | (2006.01) | |
| G01S 19/40 | (2010.01) | |
| G01S 19/22 | (2010.01) | |
| G01S 13/44 | (2006.01) | |

(52) U.S. Cl.
CPC ............ *G01S 7/023* (2013.01); *G01S 7/4052* (2013.01); *G01S 13/4418* (2013.01); *G01S 19/22* (2013.01); *G01S 19/40* (2013.01)

(58) Field of Classification Search
CPC .... G01S 13/931; G01S 7/023; G01S 13/4418; G01S 19/22; G01S 13/9303; G01S 19/40; G01S 2013/462; G01S 7/4052; G01S 7/4021; G01S 7/4008; G01S 13/34; G01S 13/586

See application file for complete search history.

(56) References Cited

U.S. PATENT DOCUMENTS

| | | | |
|---|---|---|---|
| 3,982,244 A | * | 9/1976 | Ward .................... G01S 7/4021 |
| | | | 342/149 |
| 4,449,127 A | | 5/1984 | Sanchez |

(Continued)

FOREIGN PATENT DOCUMENTS

| | | |
|---|---|---|
| CN | 102129067 | 7/2011 |
| CN | 103135109 | 5/2013 |

OTHER PUBLICATIONS

Colone et al., "Cancellation of clutter and multipath in passive radar using a sequential approach" Radar, 2006 IEEE Conference, vol., No., pp. 7, 2006, http//ieexplore.ieee.org/stamp/stamp.jsp?tp=&arnumber=1631830.

(Continued)

*Primary Examiner* — Olumide Ajibade Akonai
(74) *Attorney, Agent, or Firm* — Bond Schoeneck & King, PLLC; George McGuire; Blaine Bettinger

(57) ABSTRACT

A system and method for mitigating multipath propagation are disclosed herein. The method may include collecting a plurality of detections of a target, forming a plurality of models each assuming at least one parameter causing multipath propagation, determining which model best fits the detections of the target, using the best fit model to approximate the ground conditions, and using the approximated ground conditions to remove the multipath error from the observed signals.

20 Claims, 4 Drawing Sheets

(56) References Cited

U.S. PATENT DOCUMENTS

| | | | |
|---|---|---|---|
| 5,457,463 A * | 10/1995 | Vencel | G01S 7/4052 |
| | | | 342/169 |
| 6,125,308 A | 9/2000 | Hills et al. | |
| 7,026,981 B1 | 4/2006 | Smith, Jr. | |
| 7,161,529 B1 * | 1/2007 | Smith, Jr. | G01S 7/292 |
| | | | 342/108 |
| 7,751,829 B2 | 7/2010 | Masuoka et al. | |
| 8,026,844 B2 | 9/2011 | Fox et al. | |
| 8,170,085 B2 | 5/2012 | Han | |
| 8,242,949 B2 | 8/2012 | DeLaurentis | |
| 8,305,215 B2 | 11/2012 | Markhovsky et al. | |
| 8,610,041 B1 * | 12/2013 | Boardman | F42B 15/01 |
| | | | 244/3.1 |
| 8,618,976 B2 | 12/2013 | Paglieroni et al. | |
| 2008/0018524 A1 * | 1/2008 | Christianson | G01S 7/4026 |
| | | | 342/75 |
| 2012/0127029 A1 | 5/2012 | Rachlin et al. | |
| 2012/0235858 A1 * | 9/2012 | Dougherty | G01S 7/4026 |
| | | | 342/169 |
| 2013/0278466 A1 | 10/2013 | Owen | |
| 2013/0332115 A1 | 12/2013 | Pratt et al. | |
| 2016/0077204 A1 * | 3/2016 | Lee | G01S 13/46 |
| | | | 342/126 |
| 2016/0161597 A1 * | 6/2016 | Treptow | G01S 7/4026 |
| | | | 342/174 |

OTHER PUBLICATIONS

Craig et al., "Parabolic equation modelling of the effects of multipath and ducting on radar systems" Radar and Signal Processing, IEE Proceedings, vol. 138, No. 2, pp. 153, 162, 1991 http://ieeexplore.ieee.org/stamp/stamp.jsp?tp=arnumber-89026.

Strausberger et al.,; "Modeling and performance of HF/OTH radar target classification systems," Aerospace and Electronic Systems, IEEE Transactions, vol. 28, No. 2, pp. 396, 403, 1992 http://ieeexplore.ieee.org/stamp/stamp.jsp?tp=&arnumber=144565.

* cited by examiner

METHODS AND SYSTEMS FOR MITIGATING MULTIPATH PROPAGATION

STATEMENT REGARDING FEDERALLY SPONSORED RESEARCH OR DEVELOPMENT

This invention was made with government support under W15P7T-12-C-C011 (Department of the Army). The government has certain rights in the invention.

FIELD OF THE INVENTION

The present invention is directed to methods and systems for mitigating multipath propagation and, more particularly, to systems that mitigate multipath propagation through modeling ground conditions.

BACKGROUND

When target signals are received by a radar, they are occasionally received with embedded multipath errors. Multipath errors arise when a signal reaches the receiver from two or more paths. This often occurs if the signal reflects off a large surface, such as a building, a land mass, water, or the atmosphere, resulting in two signals from the same transmission (often the line-of-sight signal and the reflected signal) reaching the receiver at nearly the same time.

Embedded multipath interference will distort the signal in an unknown, but not random, way. If several detections are made on, for example, a ballistic target, the detections will not follow the smooth parabolic arc of the ballistic target, but instead show a higher order curve that deviates about the parabolic curve. The position errors in these detections could cause the radar to classify the target incorrectly, to break track, or to estimate its position or path incorrectly. Thus, mitigating multipath errors is essential for the accurate and reliable tracking of targets in a multipath environment.

Most efforts to mitigate multipath interference involve transmitting wideband (or sweeping narrowband) signals, installing multipath fences or covering the area with absorber material, detecting with multiple, spatially diverse antennas, or using algorithms specifically designed for a particular emplacement scenario. These efforts, however, are limited to a specific context and are not adaptable to any emplacement scenario.

Accordingly, a need exists in the art for a method and system to mitigate the effect of multipath errors in nearly any emplacement scenario.

SUMMARY OF THE INVENTION

The present disclosure is directed to inventive methods and systems for mitigating multipath errors that can adapt to any emplacement scenario. Accordingly, various embodiments herein are directed to a multipath error mitigation method that can model, in any emplacement, a ground condition causing a multipath and thus remove the multipath signal from the observed target signal.

In an aspect, a system for mitigating multipath errors comprises: an antenna configured to receive a plurality of radar detections of a target, wherein the radar detections have embedded multipath errors; and a computing device configured to at least partially cancel the embedded multipath errors, comprising: a multipath simulation module configured to generate at least one simulated multipath-embedded candidate signal from the plurality of radar detections and from at least one assumed ground condition; and a signal correction module configured to subtract the at least one simulated multipath-embedded candidate signal from at least one of the plurality of radar detections to at least partially cancel the embedded multipath errors.

According to an embodiment, the multipath simulation module further comprises: signal modeling module configured to model at least one direct path signal from at least one simulated target path and to model at least one multipath signal from at least one simulated ground condition model, and to combine the at least one modeled direct path signal and the at least one modeled multipath signal to form the at least one simulated multipath-embedded candidate signal.

According to an embodiment, the multipath simulation module further comprises: target path projection module configured to receive the plurality of detections and to form the at least one simulated target path from the plurality of detections; and ground condition modeling module, configured to form the simulated ground condition model from the at least one assumed ground condition.

According to an embodiment, the multipath simulation module further comprises a signal comparison module configured to calculate an error value between the at least one candidate signal and at least one of the plurality of detections, and to compare the error value to a predetermined threshold, wherein the signal modeling module is configured to generate at least one new candidate signal from at least one new assumed ground condition, upon determining that the error value exceeds the predetermined threshold.

According to an embodiment, the multipath simulation module further comprises: a signal comparison module configured to calculate a first error value between a first candidate signal of the at least one candidate signals and at least one of plurality of detections, and to calculate a second error value between a second candidate signal of the at least one candidate signals and at least one of the plurality of detections, wherein the signal correction module selects, for subtraction, the candidate signal having the lowest error from the first candidate signal and the second candidate signal.

According to an embodiment, the error value is calculated by performing a least means squared calculation between the candidate combined signal and the observed target positions.

According to an embodiment, each error value is calculated by performing a least means squared calculation between the candidate combined signal and the observed target positions.

According to an embodiment, the simulated target flight path is a line of best fit formed from the plurality of observed target positions.

According to an embodiment, the at least one ground condition is at least one of: a ground surface conductivity, an electrical permittivity, a slope, or a surface roughness.

According to an embodiment, the multipath simulation module is configured to receive a new plurality of target detections and to form a new candidate signal from the new plurality of target detections.

A computer program product encoded in a non-transitory computer readable storage medium having program instructions embodied therewith, the program instructions executable by a processor to cause the processor to perform an algorithm comprising the steps of: receiving a plurality of radar signals having embedded multipath errors; determining from the plurality of radar signals a plurality of detections of a target; modeling at least one direct flight path of the target, according to the plurality of detections; modeling at least one ground condition; modeling a direct flight path signal from the modeled direct flight path and a multipath signal from the modeled ground condition; combining the at least one modeled direct flight path signal and the at least one multipath signal to form at least one candidate combined signal; subtracting the at least one candidate combined signal from at least one of the plurality of detections to at least partially cancel the embedded multipath errors.

According to an embodiment, the algorithm further comprises the steps of: calculating an error value between at least a portion of the candidate combined signal and at least one of the plurality of detections; determining if the error value is above a predetermined threshold; modeling a new multipath signal according to a new ground condition model determining that the error value is above a predetermined threshold; combining the modeled flight path signal with the new multipath signal to form a new candidate combined signal.

According to an embodiment, the step of subtracting further comprises the step of selecting a candidate combined signal from the at least one candidate combined signal having a lowest calculated error value with respect to at least one of the observed target positions, wherein the at least one candidate combined signal comprises a plurality of candidate combined signals, wherein each of the plurality of candidate combined signals is formed from a unique multipath signal from the at least one multipath signals, each unique multipath signal assuming at least one unique ground condition.

According to an embodiment, the error value is calculated by performing a least means squared calculation between the candidate combined signal and at least one of the plurality of target of detections.

According to an embodiment, the error value is calculated by performing a least means squared calculation between the candidate combined signal and the plurality of target detections.

According to an embodiment, the modeled direct flight path of the target is a line of best fit formed from the plurality of observed target positions.

According to an embodiment, the modeled direct flight path of the target includes estimated future positions of the target.

According to an embodiment, the ground condition model may simulate at least one of: ground surface conductivity, electrical permittivity, slope, or surface roughness.

According to an embodiment, the algorithm further comprises the steps of: receiving a second plurality of radar signals having embedded multipath errors; determining from the second plurality of radar signals a second plurality of target detections; updating the at least one direct flight path of the target according to the plurality of observed target positions and the second plurality of observed target positions.

According to an embodiment, the target is a ballistic projectile.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
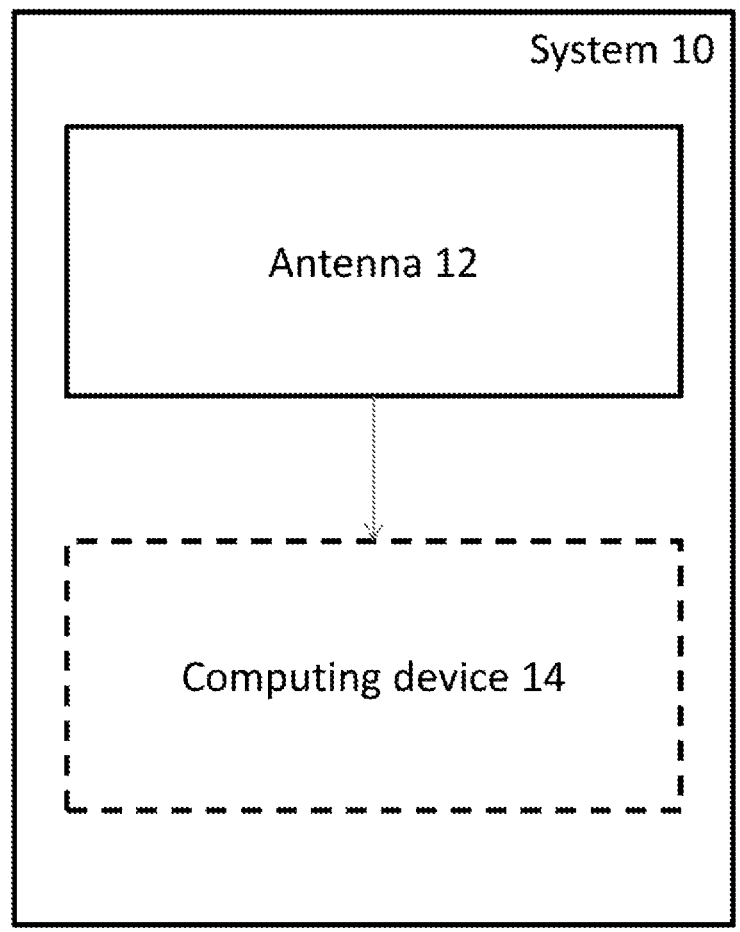
FIG. 1 is a schematic of a system for mitigating multipath propagation in accordance with an embodiment.

Referring now to the drawings, wherein like reference numerals refer to like parts throughout, there is shown in FIG. 1 a system 10 for radar multipath mitigation. As shown in FIG. 1, the system may include receive antenna 12 and accompanying hardware for receiving, processing, down-converting, and digitizing radar signals according to methods known in the art. System 10 may further include a computing device 14 for receiving and processing the radar signals received by antenna 12, and in an embodiment, implementing the program modules and algorithm described in FIGS. 2-4 and the accompanying description. One of ordinary skill in the art will appreciate that system 10 may include additional hardware, firmware, or software, implemented in computing device 14 or in addition to computing device 14, as may be necessary to process received radar signals and as is known in the art.

Figure 2:
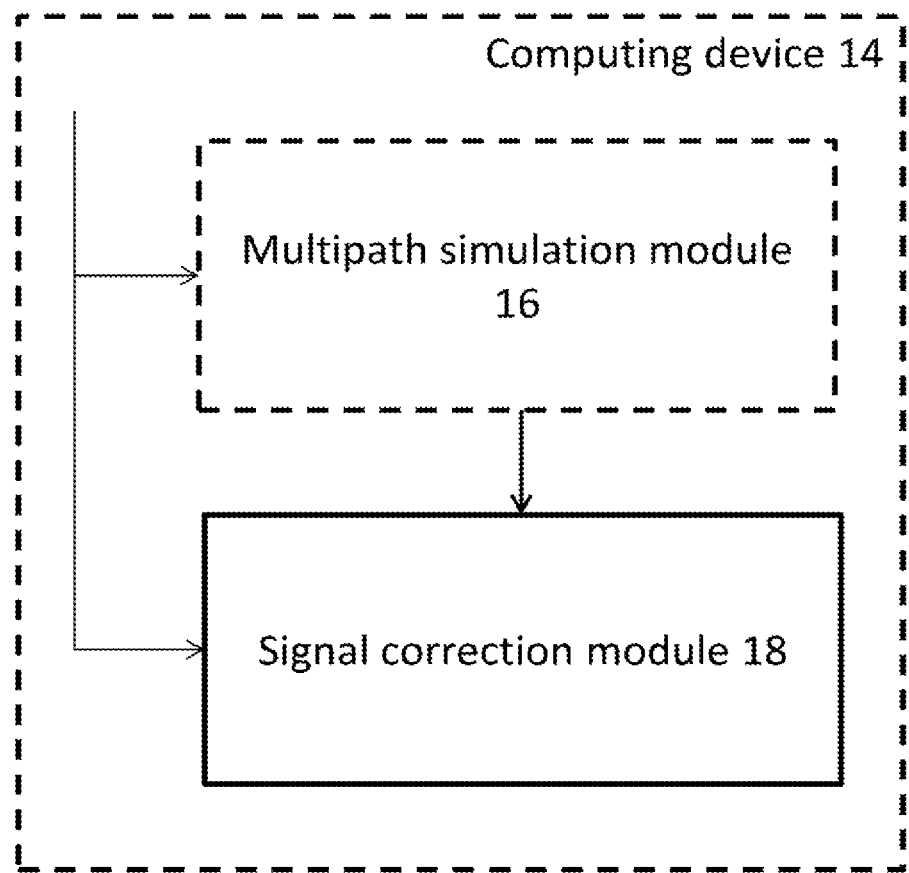
FIG. 2 is a schematic of a program in accordance with an embodiment.
Figure 3:
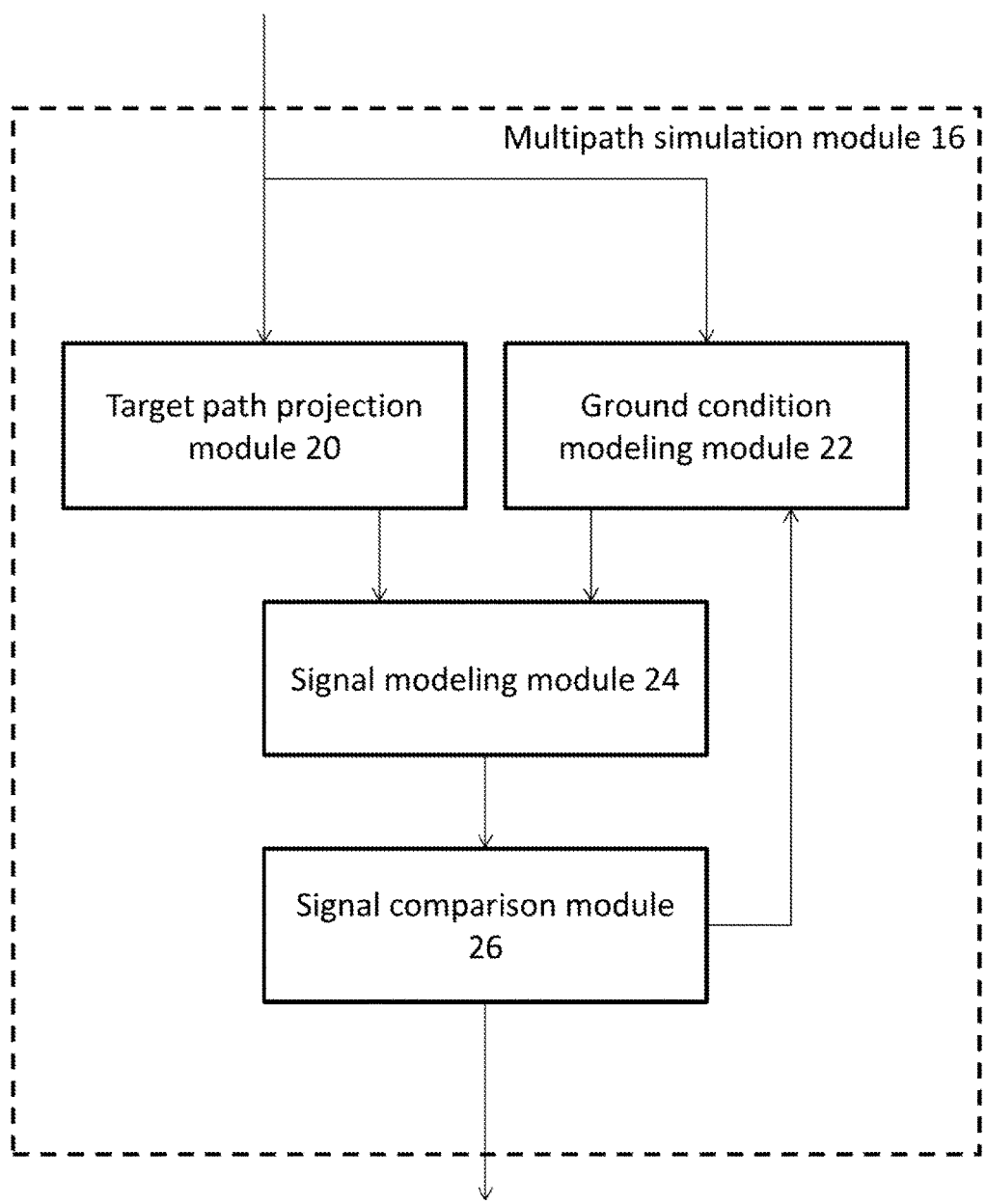
FIG. 3 is a schematic of a program in accordance with an embodiment.
Figure 4:
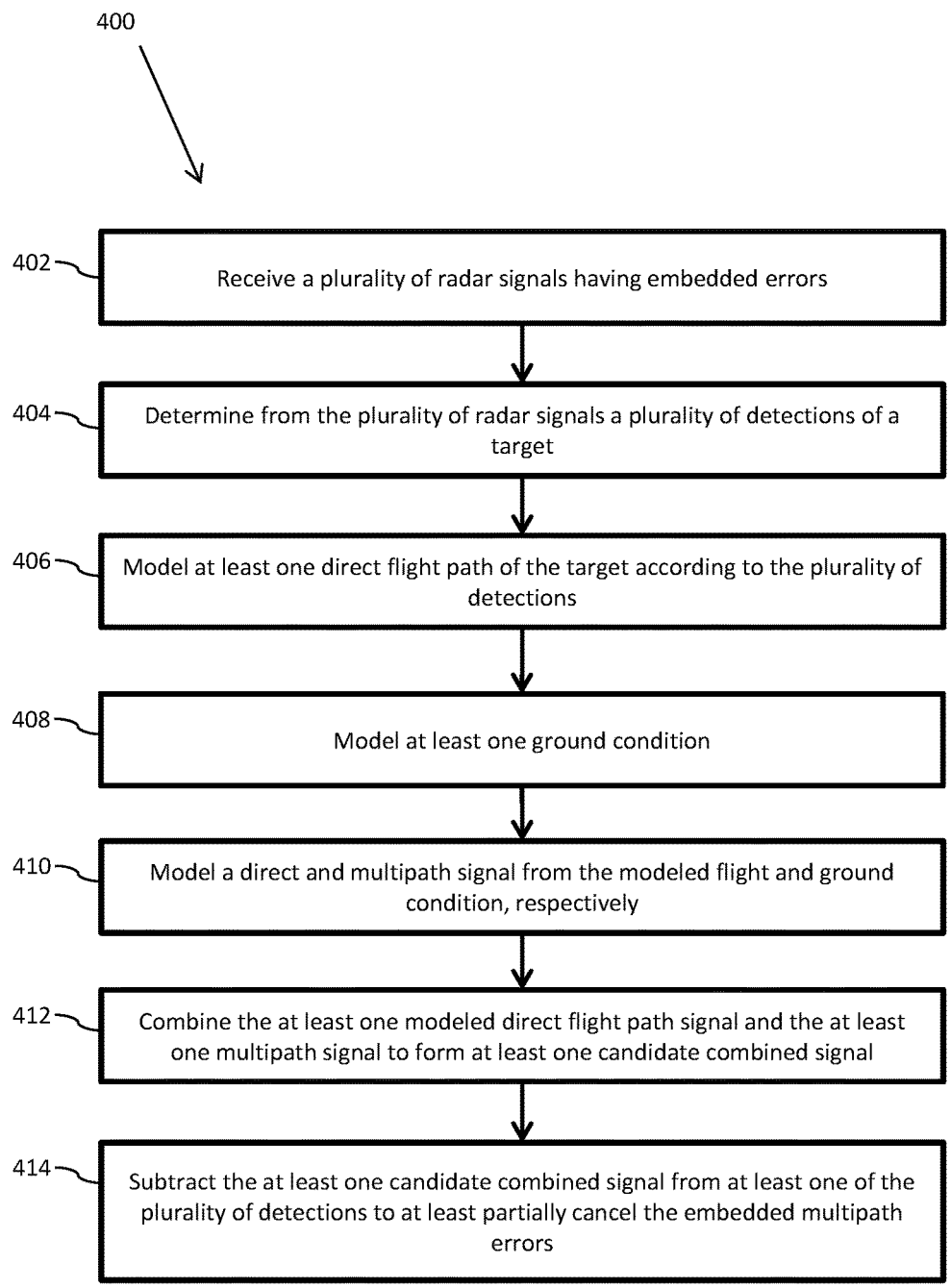
FIG. 4 is a flowchart of a method according to an embodiment.

Again, digitized signals may be processed on computing device 14 according to a process implemented by program modules shown in FIGS. 2-4 which model different scenarios of multipath interference where unknown parameters of the ground are assumed and use the modeled scenarios to cancel existing multipath in the signal. Computing device 14 may be a computer, such as a laptop, a custom computing device, or any other device known in the art sufficient for receiving data and storing and executing program modules or algorithm as discussed in this disclosure.

Referring now to FIG. 2, multipath simulation module 16 may receive a plurality of detections of a ballistic target from receive antenna 12. In an exemplary embodiment, the multipath simulation module 16 receives a sufficient number of detections to predict a ballistic target's propagation path. Herein, a ballistic target or projectile refers to an airborne object, whose flight is not presently powered, but instead the result from an earlier applied force, (e.g. a bullet, ballistic missile, or mortar round) or gravity, (e.g. a bomb released from an airplane). In an exemplary embodiment, multipath simulation module 16 calculates, from the received detections and from a modeled ground condition, a simulated multipath signal which is subtracted from the received data by signal correction module 18, to arrive at a likely direct path signal, having canceled the multipath interference.

Referring now to FIG. 3, according to an embodiment, multipath simulation module 16 includes a target path projection module 20, configured to receive the plurality of detections and to simulate at least a portion of the target's path. The simulation may be performed according to any means known in the art for determining the trajectory of a ballistic target from a plurality of samples. For example, in one embodiment, the target's path may be determined by simply constructing a line of best fit along the received samples. Further, the line of best fit may be projected beyond the received samples and tailored to follow the path of a ballistic projectile. As mentioned above, the simulated target path may be only a portion of the trajectory, or according to an alternative embodiment, may be the entire trajectory. For example, in one embodiment, target path projection module 20 may only simulate the portion of the target's path already traveled, correcting the received plots as they are received. In an alternative embodiment, target path projection module 20 may simulate a path projected a predetermined distance beyond the current received location of the target. For example, the target path projection module 20 may simulate the path of target as far as the target's next predicted location. In yet another embodiment, the entire trajectory of the target may be simulated. Furthermore, multiple paths may be generated to cover multiple possible trajectories. Additionally, if the received target plots diverge by some predetermined distance, certain received plots may be excluded as outliers in certain generated paths or in all the paths.

Multipath simulation module 16 further includes a ground condition modeling module 24, configured to simulate at least one ground condition. In a preferred embodiment, ground condition modeling module 24 assumes at least one ground condition causing multipath path in the return signal. For example, the ground condition model may assume any combination of: ground surface conductivity, electrical permittivity, slope, surface roughness, or any other parameter advantageous for simulating a ground condition. One of ordinary skill will recognize that it may further be advantageous to generate multiple models, each with slightly different assumptions, to more quickly arrive at the most accurate model later in the process.

Next, multipath simulation module 16 may include a signal modeling module 24, configured to receive the simulated target path and ground condition model, and to model the direct and multipath signals that result from the simulated target path and the ground condition model. It will be obvious to one of ordinary skill in the art that the phase and magnitude of the direct-path target signal may be simulated from the range, elevation and azimuth angle of the simulated target path. Similarly, the phase and magnitude of the multipath signal may be simulated from the ground condition model, according to methods known in the art. If multiple ground condition models and multiple target paths have been generated, multiple direct and multipath signals may be simulated accordingly. Once direct and multipath signals have been modeled, each modeled direct signal may be combined with each modeled multipath path signal to form candidate combined signals. Alternatively, certain modeled direct signals may be combined with certain modeled multipath signals as will be appreciated by one skill in the art in conjunction with a review of this disclosure. Each candidate signal will then represent a simulated observed signal, as might be received at the antenna.

Multipath simulation module 16 may include signal comparison module 26 configured to compare each candidate signal to the observed signal. In an exemplary embodiment, signal comparison module 26 may generate an error between each candidate signal and the observed signal. In another embodiment, signal comparison module performs a least means squared calculation between each candidate signal and the observed signal, measuring the quality of fit between each. One of ordinary skill will recognize, in conjunction with a review of this disclosure, that, while the multipath model may extend as far as or beyond the simulated target path, only that portion which correlates to the received observed path may be compared to the observed path, unless the observed path is extrapolated or otherwise artificially extended across the length of the simulated target path. The signal with the lowest error (alternatively, best fit) may be selected. Alternatively, if the error of each candidate signal does not fall below a predetermined threshold, ground condition modeling module 24 may be prompted to generate additional ground condition models and/or target path projection module 20 may be prompted to generate additional target path models. All calculated errors may be returned to ground condition modeling module 24 and target path projection module 20 so that the newly created models may be further refined according to the calculated errors and further generated models may be processed by signal modeling module 24 to create new candidate combined signals. In this way, multipath simulation module 16 may recursively generate candidate signals to determine the ground conditions most similar to the actual ground conditions.

As additional detections are received by computing device 14, the processes implemented by multipath simulation module 16 may be repeated. Indeed, as additional detections are received by the target's path may be more accurately defined, and thus the ground conditions better modeled. Accordingly, it may be advantageous to continue modeling the ground conditions as additional detections are received to arrive at an accepted multipath solution or to refine an already determined solution. Furthermore, because multipath errors change over azimuth, range, and elevation angle, the simulated multipath errors may be continuously, or periodically, adjusted over the trajectory of the target. Additionally, if multipath targets are tracked over the same or similar trajectories, the calculated multipath errors may be averaged or otherwise combined to more accurately determine the multipath errors for any given location in azimuth, range, or elevation angle, relative to the receiving antenna 12. Accordingly, computing device 14 may be further programmed to store historic multipath errors to compare to later calculated multipath errors, or to seed or otherwise configure later multipath calculations.

Once a multipath solution has been identified over a portion of a target's path, the calculated multipath signal (i.e. the combined candidate signal as described below) may be output to the signal correction module 18, where it is subtracted from the observed signal, effectively cancelling the effect of multipath errors in the observed signal. The multipath model received by signal correction module 18 may be used for already received detections, or for later-received detections. For example, a multipath signal may be generated for the observed detections a target mid-flight and used to correct the multipath error embedded in the already received detections, and to correct each incoming detection as the target progresses through its flight. If the multipath model is refined over the flight of the target, the observed signal may be corrected for successive refinement.

There is shown in FIG. 4 the steps of an algorithm for reducing or otherwise cancelling multipath embedded in a radar signal. In an embodiment, the algorithm may be embodied by program code stored in a non-transitory computer readable storage medium, the program code being executable such that a processor may perform the steps of the algorithm. In an embodiment the algorithm may be implemented by the program modules described above. However, some steps may be implemented by alternative or additional program modules, or may be divided amongst several program modules, as will be understood. One of ordinary skill will appreciate however (in conjunction with a review of this disclosure) that the steps of the algorithm may be implemented as a method, independent of storing or executing the steps: the steps themselves—or steps obviously similar and enabled by this disclosure—forming the method. As far as the method steps detailed below further explain or expand upon the functionality and capabilities of the program modules discussed above, it should be understood that the program modules may be capable of such functionality or may be easily modified to be capable of such functionality. Conversely, as far as the program modules detail functionality not defined with respect to the method steps discussed herein, it should be understand that the method may be modified or expanded to include such functionality. In this way, the program modules and method steps represent different examples and embodiments of the system defined herein, and should not be regarded as limiting.

At step 402, in an embodiment, a plurality of radar signals, embedded with multipath errors are received. As described above, the radar signals may be received with an antenna, and down-converted and processed by methods known in the art. In particular, the radar signals may be put into a form such that the remainder of steps disclosed in method 400, (and in alternative embodiment and enabled variations) may be performed.

At step 404, in an embodiment, a plurality of detections of a target are determined from the plurality of signals. Again, the target may be discriminated from any other received signals, according to methods known in the art.

At step 406, a flight path of the target may be modeled, according to the plurality of detections of a target. In an embodiment, the flight path may be modeled as a line of best fit drawn about the plurality of detections. One of ordinary skill will appreciate, in conjunction with a review of this disclosure, that any method for determining the flight path of target from a plurality of detections may be used. As described in conjunction with the target path projection module, a portion or the full target path may be modeled. In addition the target path may be extended beyond the current detected path of the target, such that the targets next detected location may be predicted, or the target's entire expected flight path may be modeled. As will be understood, multiple paths may be generated to cover multiple possible trajectories. Additionally, if the received target plots diverge by some predetermined distance, certain received plots may be excluded as outliers in certain generated paths or in all the paths.

At step 408, at least one ground condition may be modeled. As listed above, the ground condition model may be modeled from any combination of: ground surface conductivity, electrical permittivity, slope, surface roughness, or any other parameter advantageous for simulating a ground condition. Of course, as part of this step, multipath ground conditions condition models may be generated, each ground condition model assuming a slightly different ground condition. For example, one ground condition model may assume a certain ground surface conductivity, while another model may assume a different ground surface conductivity or the same ground surface conductivity and a different electrical permittivity.

At step 410, a direct and multipath signal may be simulated from the flight path model and the ground condition model, as will be understood by a person of ordinary skill in conjunction with a review of this disclosure. It similarly will be appreciated by a person of ordinary skill in the art, in conjunction with a review of this disclosure, that the phase and magnitude of the direct-path target signal may be simulated from the range, elevation and azimuth angle of the simulated target path. Similarly, the phase and magnitude of the multipath signal may be simulated from the ground condition model, according to methods known in the art. If multiple ground condition models and multiple target paths have been generated, multiple direct and multipath signals may be simulated accordingly.

At step 412, the modeled flight path signal and modeled multipath signal may be combined, such that the resulting signal may simulate the signal as would be seen by an antenna receiving a direct and multipath signal with the assumed ground conditions. If multiple ground condition models and multiple target paths have been generated, multiple direct and multipath signals may be simulated accordingly, with each modeled direct signal may being combined with each modeled multipath path signal to form candidate combined signals. Alternatively, certain modeled direct signals may be combined with certain modeled multipath signals as will be appreciated by one skill in the art in conjunction with a review of this disclosure. Each candidate signal will then represent a simulated observed signal, as might be received at the antenna.

Once at least one candidate combined signal has been formed, the candidate combined signal may be compared to the detected signals, and an error value may be calculated defining how close the combined signal is to the detected signals. The calculated error value may be compared to a predetermined value. If the error of the combined signal exceeds the predetermined error value, a new combined signal may be generated, using either a new modeled flight path, a new modeled ground condition, or both. Similarly, once the new combined signal has been generated, an error value may be generated and again compared to the predetermined value. By recursively generating new combined signals, the ground condition and modeled flight path may be made increasingly more accurate. If multiple combined signals have been simulated, each may be compared, or only a select number may be compared, in alternate embodiments. The signal with the lowest error may be selected. The two methods may also be combined: if multiple combined signal have been created, the best may be selected and compared to an error value, etc. In yet another embodiment, new combined signals may be continuously generated throughout the flight of the target, or after the flight of the target, to arrive at the closest possible combined signal. Furthermore, all calculated errors may be considered when modeling the new flight path or the new ground condition, in order to intelligently move the models toward an increasingly accurate combined signal, as will be appreciated by a person of ordinary skill in the art.

At step 414, the at least one candidate combined signal may be subtracted from at least one of the plurality of detections, in order to at least partially cancel the embedded multipath errors.

Of course as new detections are received, the flight path model and combined signals may be updated to account for the new and additional information. Furthermore any known information about the surrounding area may be used to seed the ground condition model (for example, if the electrical permittivity of an area is already known, it may be input as a starting value to the ground condition model).

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, and/or method described herein. In addition, any combination of two or more such features, systems, articles, materials, kits, and/or methods, if such features, systems, articles, and/or methods are not mutually inconsistent, is included within the scope of the present disclosure.

A "module" or "component" as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for mitigating multipath errors, comprising:
   an antenna configured to receive a plurality of radar detections of a target, wherein the radar detections have embedded multipath errors; and
   a computing device configured to at least partially cancel the embedded multipath errors, comprising:
      a multipath simulation module configured to generate at least one simulated multipath-embedded candidate signal from the plurality of radar detections and from at least one assumed ground condition; and
      a signal correction module configured to subtract the at least one simulated multipath-embedded candidate signal from at least one of the plurality of radar detections to at least partially cancel the embedded multipath errors.

2. The system of claim 1, wherein the multipath simulation module further comprises:
   a signal modeling module configured to model at least one direct path signal from at least one simulated target path and to model at least one multipath signal from at least one simulated ground condition model, and to combine the at least one modeled direct path signal and the at least one modeled multipath signal to form the at least one simulated multipath-embedded candidate signal.

3. The system of claim 1, wherein the multipath simulation module further comprises:
   a target path projection module configured to receive the plurality of detections and to form the at least one simulated target path from the plurality of detections; and
   a ground condition modeling module, configured to form the simulated ground condition model from the at least one assumed ground condition.

4. The system of claim 2, wherein the multipath simulation module further comprises:
   a signal comparison module configured to calculate an error value between the at least one candidate signal and at least one of the plurality of detections, and to compare the error value to a predetermined threshold, wherein the signal modeling module is configured to generate at least one new candidate signal from at least one new assumed ground condition, upon determining that the error value exceeds the predetermined threshold.

5. The system of claim 2, wherein the multipath simulation module further comprises:
a signal comparison module configured to calculate a first error value between a first candidate signal of the at least one candidate signals and at least one of plurality of detections, and to calculate a second error value between a second candidate signal of the at least one candidate signals and at least one of the plurality of detections, wherein the signal correction module selects, for subtraction, the candidate signal having the lowest error from the first candidate signal and the second candidate signal.

6. The system of claim 4, wherein the error value is calculated by performing a least means squared calculation between the candidate combined signal and the observed target positions.

7. The system of claim 5, wherein each error value is calculated by performing a least means squared calculation between the candidate combined signal and the observed target positions.

8. The system of claim 2, wherein the simulated target flight path is a line of best fit formed from the plurality of observed target positions.

9. The system of claim 1, wherein the at least one ground condition is at least one of: a ground surface conductivity, an electrical permittivity, a slope, or a surface roughness.

10. The method of claim 2, wherein the multipath simulation module is configured to receive a new plurality of target detections and to form a new candidate signal from the new plurality of target detections.

11. A computer program product encoded in a non-transitory computer readable storage medium having program instructions embodied therewith, the program instructions executable by a processor to cause the processor to perform an algorithm comprising the steps of:
receiving a plurality of radar signals having embedded multipath errors;
determining from the plurality of radar signals a plurality of detections of a target;
modeling at least one direct flight path of the target, according to the plurality of detections;
modeling at least one ground condition;
modeling a direct flight path signal from the modeled direct flight path and a multipath signal from the modeled ground condition;
combining the at least one modeled direct flight path signal and the at least one multipath signal to form at least one candidate combined signal;
subtracting the at least one candidate combined signal from at least one of the plurality of detections to at least partially cancel the embedded multipath errors.

12. The algorithm of claim 11, further comprising the steps of:
calculating an error value between at least a portion of the candidate combined signal and at least one of the plurality of detections;
determining if the error value is above a predetermined threshold;
modeling a new multipath signal according to a new ground condition model determining that the error value is above a predetermined threshold;
combining the modeled flight path signal with the new multipath signal to form a new candidate combined signal.

13. The algorithm of claim 11, wherein the step of subtracting further comprises the step of selecting a candidate combined signal from the at least one candidate combined signal having a lowest calculated error value with respect to at least one of the observed target positions, wherein the at least one candidate combined signal comprises a plurality of candidate combined signals, wherein each of the plurality of candidate combined signals is formed from a unique multipath signal from the at least one multipath signals, each unique multipath signal assuming at least one unique ground condition.

14. The algorithm of claim 12, wherein the error value is calculated by performing a least means squared calculation between the candidate combined signal and at least one of the plurality of target of detections.

15. The algorithm of claim 13, wherein the error value is calculated by performing a least means squared calculation between the candidate combined signal and the plurality of target detections.

16. The algorithm of claim 11, wherein the modeled direct flight path of the target is a line of best fit formed from the plurality of observed target positions.

17. The algorithm of claim 11, wherein the modeled direct flight path of the target includes estimated future positions of the target.

18. The method of claim 11, wherein the ground condition model may simulate at least one of:
ground surface conductivity, electrical permittivity, slope, or surface roughness.

19. The method of claim 11, further comprising the steps of:
receiving a second plurality of radar signals having embedded multipath errors;
determining from the second plurality of radar signals a second plurality of target detections;
updating the at least one direct flight path of the target according to the plurality of observed target positions and the second plurality of observed target positions.

20. The method of claim 11, wherein the target is a ballistic projectile.

* * * * *